Patented July 4, 1944

2,352,641

UNITED STATES PATENT OFFICE 2,352,641

PREPARATION OF BETA-ALKOXY MONO-CARBOXYLIC ACIDS

Frederick E. Küng, Akron, Ohio, assignor to The B. F. Goodrich Company, New York, N. Y., a corporation of New York No Drawing. Application August 5, 1941, Serial No. 405,512

4 Claims. (Cl. 260—535)

This invention relates to a novel process for the preparation of beta-alkoxy derivatives of monocarboxylic acids, particularly beta-alkoxy derivatives of saturated aliphatic monocarboxylic acids such as beta-alkoxy propionic acids, and to the conversion of such acids into alkyl esters of alpha beta unsaturated monocarboxylic acids such as the alkyl esters of acrylic and methacrylic acids.

In a copending application Serial No. 393,671, filed May 15, 1941, an economical method of preparing lactones of beta-hydroxy carboxylic acids from the reaction of a ketene with a carbonyl compound such as an aldehyde or ketone has been described. The ease with which such lactones are now obtained makes it desirable to use these compounds as starting materials for the synthesis of other compounds such as unsaturated acids, esters and nitriles all of which are extremely useful as polymerizable materials in the production of synthetic rubber, synthetic resins and the like.

I have now discovered that beta-lactones may be reacted with alcohols to prepare beta-alkoxy carboxylic acids which may then be converted into unsaturated carboxylic acid esters by dehydration. Thus, unsaturated esters useful in polymerization may conveniently be prepared from beta-lactones. Moreover, the beta-alkoxy carboxylic acids themselves are useful organic compounds, for example, the beta-dodecaneoxy or other high molecular weight alkoxy derivatives are particularly useful as emulsifying agents.

It is quite surprising that beta-lactones yield beta-alkoxy derivatives when treated with alcohols since other lactones such as gamma lactones yield alkyl esters of hydroxy acids when treated with an alcohol.

The reaction of beta-lactones with alcohols to yield beta-alkoxy acids according to this invention proceeds substantially as illustrated by the following equation:

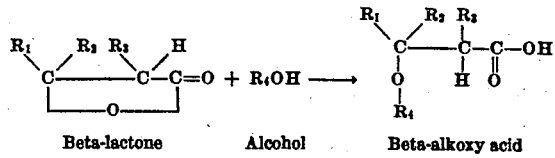

Beta-lactone   Alcohol   Beta-alkoxy acid where $R_1$, $R_2$ and $R_3$ represent hydrogen, alkyl, aralkyl, aryl or substituted alkyl, aryl or aralkyl radicals and $R_4$ represents an alkyl, aralkyl or substituted alkyl or aralkyl radical.

The beta-lactone employed may be any lactone of a beta-hydroxy monocarboxylic acid which has at least one hydrogen atom on the alpha carbon atom, for example, beta-lactones of saturated aliphatic monocarboxylic acids such as beta-hydroxy propionic acid lactone, commonly known as hydracrylic acid lactone, beta-hydroxy butyric acid lactone, alpha-methyl hydracrylic acid lactone, beta-hydroxy n-valeric acid lactone, beta-hydroxy alpha-methyl butyric acid lactone, alpha-ethyl hydracrylic acid lactone, beta-hydroxy isovaleric acid lactone, beta-hydroxy n-caproic acid lactone, beta-hydroxy alpha-methyl valeric acid lactone, beta-methyl beta-ethyl hydracrylic acid lactone, alpha-methyl beta-ethyl hydracrylic acid lactone, alpha-propyl hydracrylic acid lactone, alpha-butyl hydracrylic acid lactone or the like; beta-lactones of substituted carboxylic acids such as beta-phenyl hydracrylic acid lactone, alpha-phenyl hydracrylic acid lactone, beta-chloroethyl hydracrylic acid lactone, beta-benzyl hydracrylic acid lactone, beta-cyclohexyl hydracrylic acid lactone and the like, and other beta-lactones of the nature hereinabove set forth.

The alcohol which is reacted with the lactone may be any monohydric alcohol such as ethyl alcohol, methyl alcohol, isopropyl alcohol, propyl alcohol, methyl-ethyl-carbinol, trimethyl-carbinol, n-amyl alcohol, di-ethyl-carbinol, tert.-butyl-carbinol, methyl-n-propyl carbinol, tert.-amyl alcohol, hexyl alcohol, n-heptyl alcohol, n-octyl alcohol, lauryl alcohol, myristyl alcohol, palmityl alcohol, cyclohexanol, benzyl alcohol, phenyl ethyl alcohol, ethoxy ethanol, chloroethyl alcohol, terpineol or the like.

The preferred compounds to be used in the practice of this invention are the beta-lactones of saturated aliphatic monocarboxylic acids and the saturated alkyl alcohols. Accordingly, preferred embodiments of the invention include the reaction of hydracrylic acid lactone with methyl, ethyl, propyl or butyl alcohol to yield a beta-alkoxy propionic acid and the reaction of alpha methyl hydracrylic acid lactone with methyl, ethyl, propyl or butyl alcohol to yield an alpha-methyl beta-alkoxy propionic acid.

As mentioned hereinabove, the beta-alkoxy compounds formed by the reaction of a beta-lactone with an alcohol may be dehydrated to give alpha-beta unsaturated esters. This dehydration may be represented as follows:

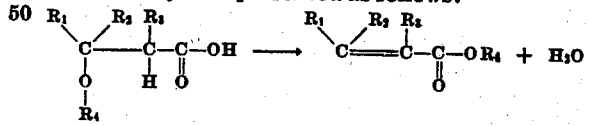

As examples of this reaction, beta-methoxy propionic acid gives, upon dehydration, methyl acrylate; beta-ethoxy propionic acid gives ethyl acrylate; alpha-methyl beta-methoxy propionic acid gives methyl methacrylate and alpha-methyl beta-ethoxy propionic acid gives ethyl methacrylate.

The reaction of the beta-lactone with the alcohol to yield a beta-alkoxy carboxylic acid is best carried out by refluxing the alcohol with the lactone for about 2 to 10 hours at the boiling point of the alcohol. When high boiling alcohols are used, a suitable solvent such as acetone may be employed as the refluxing medium. Alternatively, a mixture of the alcohol and the lactone may be heated in an autoclave at a temperature of about 50–200° C. if desired, but this method in general produces no better results than are obtained simply by refluxing. The reactants may be mixed in any desired proportions but highest yields of the desired product are obtained when an excess of the alcohol is employed.

If it is desired to convert the beta-alkoxy carboxylic acid formed by the reaction of the beta-lactone and an alcohol into an unsaturated ester, this may be accomplished by dehydrating the alkoxy compound in any ordinary way such as by distilling the compound with a dehydration catalyst such as sulfuric acid, phosphoric acid, methane sulfonic acid, benzene sulfonic acid or the like or by passing vapors of the compound over a dehydration catalyst such as silica gel or the like at an elevated temperature of about 200°–400° C. When carrying out the dehydration it is desirable that a substance be present which prevents the polymerization of the ester formed. Suitable substances for this purpose are copper, copper salts, hydroquinone or other polymerization inhibitors.

It is also possible to carry out both of the hereinabove described reactions in one step. Thus, a beta-lactone may be refluxed with an alcohol in the presence of a dehydration catalyst such as sulfuric acid and the mixture then distilled. In this case, an unsaturated ester is produced directly from the beta-lactone and the alcohol.

The following examples will illustrate the practice of the invention but it is not intended to limit the invention thereto, for numerous modifications in the particular compounds and conditions employed will be obvious to those skilled in the art.

Example I

A mixture of 30 g. of hydracrylic acid lactone and 90 g. of absolute ethanol was refluxed for 5 hours. The reaction product was then distilled at reduced pressure. 36 g. (75%) of beta-ethoxy propionic acid (B. P. 15 mm.—105°–115° C.) were thus obtained.

Example II 72 g. of hydracrylic acid lactone and 200 g. of synthetic methanol were refluxed for 6 hours and the reaction product was then distilled, first at atmospheric pressure to remove the excess methanol and then at reduced pressure from an Anders flask. 73 g. (72%) of beta-methoxy propionic acid having the following physical constants were obtained: M. P.—26° C. to —27° C.; B. P.$_{10}$ 99°–101° C.; density at 26° C.—1.099; N$_D$ 26°—1.4166.

The chemical constitution of beta-methoxy propionic acid was determined by reacting it with ammonia whereupon a violent reaction occurred which yielded a product corresponding to the formula

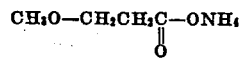

If the product had been an ester of a hydroxy acid, this neutralization reaction would not have occurred since no acid group would have been present.

Example III 26 g. of beta-methoxy propionic acid, obtained in Example II were dehydrated by heating in a distilling flask with 35 g. of concentrated sulfuric acid and a trace of copper acetate. Distillation yielded a mixture of methyl acrylate and water which was partly purified by drying and redistillation. 13.5 g. (B. P. 67°–72° C.) of methyl acrylate were thus obtained.

Example IV 40 g. of beta-methoxy propionic acid were distilled from 10 g. of methane sulphonic acid (CH$_3$—SO$_3$H) in four portions of 10 g. each. 40 g. of crude methyl acrylate and water were obtained.

Example V

In one hour 34 g. of beta-methoxy propionic acid were passed into a solution of 10 g. of methane sulfonic acid and a trace of copper acetate at 180°–200° C. On distillation of the product the yield of methyl acrylate was 67%.

I claim:

1. The method of preparing a beta-alkoxy monocarboxylic acid which comprises reacting a lactone of a beta-hydroxy monocarboxylic acid, having at least one hydrogen atom on the alpha carbon atom, with a monohydric alcohol.

2. The method of preparing a beta-alkoxy aliphatic monocarboxylic acid which comprises reacting a lactone of a saturated aliphatic beta-hydroxy monocarboxylic acid having at least one hydrogen atom on the alpha carbon atom, with an alkyl alcohol.

3. The method of preparing beta-methoxy propionic acid which comprises reacting beta-hydroxy propionic acid lactone with methyl alcohol.

4. The method of preparing beta-ethoxy propionic acid which comprises reacting beta-hydroxy propionic acid lactone with ethyl alcohol.

FREDERICK E. KÜNG.